United States Patent

Wordsworth et al.

[11] Patent Number: 5,876,660
[45] Date of Patent: Mar. 2, 1999

[54] SINTERED REACTION-BONDED SILICON NITRIDE COMPONENTS

[75] Inventors: Robert Alan Wordsworth, Rugby; Carol Jayne Pindar, Daventry; Nicholas Dominic Butler, Rugby; Matthew Arnold Hepworth, Cheadle Hulme, all of England

[73] Assignee: T&N Technology Ltd., Rugby, England

[21] Appl. No.: 750,904

[22] PCT Filed: May 9, 1995

[86] PCT No.: PCT/GB95/01037

§ 371 Date: Dec. 19, 1996

§ 102(e) Date: Dec. 19, 1996

[87] PCT Pub. No.: WO96/01236

PCT Pub. Date: Jan. 18, 1996

[30] Foreign Application Priority Data

Jul. 1, 1994 [GB] United Kingdom .................. 9413267

[51] Int. Cl.$^6$ ........................................... C04B 35/65
[52] U.S. Cl. ..................... 264/647; 264/40.1; 264/659; 264/676; 264/683
[58] Field of Search ............................. 264/647, 40.1, 264/40.4, 659, 676, 683

[56] References Cited

U.S. PATENT DOCUMENTS

| | | | |
|---|---|---|---|
| 4,719,073 | 1/1988 | Langan | 264/40.1 |
| 4,919,868 | 4/1990 | Huang | 264/647 |
| 5,166,106 | 11/1992 | Edler et al. | 501/98 |
| 5,213,729 | 5/1993 | Edler et al. | 264/647 |
| 5,308,561 | 5/1994 | Leimer et al. | 264/65 |

FOREIGN PATENT DOCUMENTS

| | | |
|---|---|---|
| 60-96575 A | 10/1983 | Japan . |
| 5-36464 A | 2/1993 | Japan . |
| WO 82/04245 | 12/1982 | WIPO . |

OTHER PUBLICATIONS

Mangels, John A., Effect of Rate–Controlled Nitriding & Nitriding Atmospheres on the Formation of Reaction–Bonded $Si_3N_4$ In Ceramic Bulletin, vol. 60, No. 6 (1981).

*Primary Examiner*—James Derrington
*Attorney, Agent, or Firm*—Synnestvedt & Lechner

[57] ABSTRACT

Sintered reaction-bonded silicon nitride components, e.g., automotive components, are made by forming a powder mixture comprising silicon and oxide or oxide precursor additives. These additives comprise alumina and a calcium compound. The powder is formed into a preform, the silicon is reacted with nitrogen in a nitriding process to form silicon nitride, and the so-formed silicon nitride is sintered.

12 Claims, 2 Drawing Sheets

SINTERED REACTION-BONDED SILICON NITRIDE COMPONENTS

FIELD OF THE INVENTION

This invention is concerned with a method of manufacturing dense sintered reaction-bonded silicon nitride components and with components made by said method. The term "dense" is used herein to mean substantially non-porous and at least 95% of theoretical density.

BACKGROUND OF THE INVENTION

Silicon nitride components can be made by sintering silicon nitride powder. Such sintering can only occur in the presence of a liquid phase. Current formulations therefore include 10–20% by weight of one or more oxides including yttria, rare earths, alumina, magnesia etc. which, in combination with the oxide layer present on the surface of the silicon nitride, form a glass in which the latter can dissolve and reprecipitate to effect consolidation. Components made by this method are used as structural components intended to withstand temperatures as high as 1400° C. and therefore have utilised those oxides such as yttria and the rare earths, which generate the most refractory glasses and crystalline silicates. This approach, together with the use of high purity silicon nitride powders and sophisticated control of microstructure during sintering, has resulted in the production of ceramics with flexural strengths of about 1 GPa at room temperature which retain a high proportion of this value at 1200° and, sometimes, 1400° C. However, this method incurs production costs which are sufficiently high to inhibit its use in high volume applications such as the substitution of metal components in the automotive and general engineering industries. These costs are due to high material costs, high sintering temperatures (often above 1800° C.), and high process losses.

An alternative to starting with silicon nitride powder in the manufacture of silicon nitride components is to utilise metallic silicon powder which is available at a cost which is lower by about one order of magnitude. Nitridation of silicon powder at temperatures in the range 1150°–1400° C. is a well established process for the formation either of silicon nitride powder or of porous reaction-bonded silicon nitride components. Whilst the latter have a useful strength of about 200 MPa, which is retained to at least 1200° C., together with excellent thermal shock characteristics, their porosity and poor resistance to wear make them unsuitable for use as engineering components.

Several authorities (including Mangels Ceram Eng Sci Proc 1981 2 589–603) have shown that silicon preforms containing sintering aids such as MgO, $Al_2O_3$ or $Y_2O_3$ can be nitrided at temperatures below 1400° C. and sintered in nitrogen at temperatures in the range 1750°–1850° C. to form components having 98% of theoretical density. This sintered reaction-bonded silicon nitride has the advantage of a low overall linear shrinkage in the range 9–12% compared to a doubling of these values for components derived from a sintered silicon nitride powder. Despite this little commercial attention has been paid to the sintered reaction-bonded silicon nitride process because the reaction between silicon and nitrogen is highly exothermic and, if not conducted with care, easily results in localised heating of preforms to temperatures exceeding the melting point of silicon (1420° C.). This problem increases with the size of the furnace; nitridation times of about one week are typical. Also, after this slow nitridation stage, sintering is effected in a second graphite furnace with the component embedded in a protective powder bed. Furthermore, the mechanical properties of sintered reaction-bonded silicon nitride components are generally slightly inferior to and more difficult to control than those from the more direct sintered silicon nitride route.

Pompe (U.S. Pat. No. 4,492,665) has shown that the addition of 15–50% of fine silicon nitride powder to silicon powder acts as a dispersing aid and allows the latter to be ground using a ball mill to a grain size of <1 μm. The addition of $Y_2O_3$ and $Al_2O_3$ powders as sintering aids further dilutes the silicon and effectively mitigates the effects of the exothermic reaction during nitridation, at least on a small scale. Sintering was effected in a separate graphite furnace with the component embedded in a layer of protective powder containing $Si_3N_4$, $Al_2O_3$ and AlN with a temperature hold at 1770° C. and a peak temperature of 1850° C. Pompe also suggested that the nitridation and sintering steps could be carried out in a single furnace, although no supporting examples were provided.

More recently, Tiegs and co-workers (Ceram Eng Sci Proc 14 [1–2] 378–388, 1993) used microwave heating to produce sintered reaction-bonded silicon nitride using a one stage nitriding/sintering process with the component packed in a powder bed. As yet, this process is confined to a laboratory scale.

An obvious alternative to the use of yttria or rare earths as sintering aids is magnesia and this has been used both as such and, in conjunction with alumina, in the form of spinel $MgO.Al_2O_3$. A disadvantage however lies in the tendency of MgO to react in a carbonaceous environment according to:

$$MgO+C \rightarrow Mg+CO$$

to give products which are gaseous at temperatures >1700° C. Considerations of their volatility also exclude many other species such as the oxides of the alkali metals and boron.

Calcium oxide, CaO, has not been proposed as a sintering aid for the manufacture of sintered reaction-bonded silicon nitride because the presence of calcium has been demonstrated to lead to a deterioration in the high temperature mechanical properties of the ceramic. Calcium has recently been found to be one of the cations which can promote the formation of α' sialons $Ca_x Si_{12-m} Al_m O_n N_{16-n}$ by heating compacts of appropriate quantities of CaO, $\alpha Si_3N_4$, $Al_2O_3$, and AlN to temperatures in the range 1750°–1800° C. Although superficially attractive, this process is difficult to control whilst aluminium nitride, AlN is both relatively expensive and can introduce processing problems because of its susceptibility to hydrolysis.

Against this background, there is a requirement to provide a method of manufacturing sintered silicon nitride components suitable for high volume applications at temperatures below 1000° C. using a fast, energy efficient process starting from low cost commodity raw materials.

The invention provides a method of manufacturing a dense sintered reaction-bonded silicon nitride component, the method comprising forming a powder mixture comprising substantially pure silicon and oxide or oxide precursor additives, forming a preform from said powder mixture, the preform being generally in the shape of the component, reacting silicon in the preform with nitrogen to form silicon nitride, and sintering said silicon nitride, characterised in that said additives comprise alumina and a calcium compound.

By "substantially pure silicon", we mean unreacted silicon which will, however, inevitably, have a thin film of oxide thereon.

A method according to the invention utilises inexpensive materials and can be used to make components which have over 95% of theoretical density (typically 97 to 99%) which have good mechanical properties and can withstand temperatures up to 100° C. Thus, the components are cheap enough for use as, for example, automotive components, and are suitable for use in many applications. The use of a calcium compound enables the sintering to take place in the presence of calcium oxide which is found to allow sintering to high density at relatively low temperatures. The components produced by this method were found to have a surprisingly good surface finish with no evidence of pitting or discolouration.

The additives may form 5 to 15% by weight of the powder mixture, for example there may be about 5%, about 6% about 7.5%, or about 9.5% by weight of said additives depending on the particular additives. The alumina may form 3 to 10% by weight of the powder mixture.

Said additives may also comprise magnesia which is found to lower the peak sintering temperature necessary and thereby reduces the cost of the method. Magnesia may form up to 3.0% by weight of the powder mixture.

The calcium compound may be calcium oxide which may form 1 to 3.5% by weight of the powder mixture. Where only calcium oxide and alumina were present in the additives, it was found to be desirable to maintain a molar ration of 1:1 to 1:1.5. Where magnesia was also present, a molar ratio of 0.5:0.5:1 was found to be suitable (alumina= 1). As an alternative to calcium oxide, a precursor thereof may be used in sufficient quantity to provide said quantity of calcium oxide. Thus, the calcium compound may be calcium carbonate which reacts to provide calcium oxide, with carbon dioxide being driven off in the processing.

As mentioned above, the reaction of nitrogen with silicon is highly exothermic, and it is important, therefore, to control this reaction to ensure that the silicon does not melt. On economic grounds, however, it is desirable that this reaction takes place as rapidly as possible so that time in the furnace is minimised. These requirements can be achieved, in a method in accordance with the invention, by using a nitriding process comprising heating the preform in a furnace under a nitrogen atmosphere while controlling the temperature in the furnace and allowing nitrogen to flow into the furnace on demand, the flow rate of nitrogen into the furnace being monitored, wherein the nitriding process comprises the following phases:

a pre-reaction phase during which the temperature is raised to cause the reaction to commence;

a first reaction phase during which the temperature in the furnace is held at a substantially constant level and the flow rate of nitrogen is controlled so that it does not exceed a predetermined maximum rate, the first reaction phase being initiated when said flow rate of nitrogen exceeds a first predetermined level, and being terminated when said flow rate falls below a second predetermined level; and a second reaction phase during which the flow rate of nitrogen is maintained between predetermined upper and lower limits by controlling the temperature in the furnace.

This nitriding process also allows the heat generated in the reaction to be utilised so that the method is energy-efficient.

During the said pre-reaction phase, the temperature may be raised at 80° to 120° C. per hour, e.g. at about 100° C. per hour, until a temperature of 950° C. to 1050° C., e.g. about 1000° C., is achieved and at a slower rate thereafter, e.g. at about 40° C. per hour, until nitridation of the silicon commences. The temperature may then be further raised at a slower rate, e.g. at between 5° C. and 20° C. per hour, until said flow rate of nitrogen exceeds said first predetermined level.

Because the amount of nitrogen required to react with the silicon depends on the quantity of silicon present, said predetermined maximum flow rate of nitrogen is, preferably, determined as a function of the total weight of silicon in the furnace, a linear function being suitable. For the same reason, said predetermined upper and lower limits on the flow rate of nitrogen, applied in the second reaction phase, may also be determined as a function of the total weight of silicon in the furnace.

The second reaction phase of the nitriding process may be terminated when the temperature in the furnace reaches a predetermined level. This may terminate the nitriding process or, in order to ensure more complete reaction of the silicon with nitrogen, after the second reaction phase, the method may comprise a third reaction phase during which the temperature in the furnace is maintained substantially constant and the flow rate of nitrogen is allowed to drop.

It is preferable that, prior to said nitriding process, said preform is heated under vacuum to remove water vapour and any other volatile materials present. The preform can be heated, preferably in the same furnace used for the nitriding process, to about 800° C. and held at that temperature for about 1 hour under a vacuum of about 0.01 Torr. The nitriding process can then be commenced without allowing the preform to cool.

In order to minimise both energy use and time required, it is preferable that the silicon is reacted with nitrogen and the silicon nitride so formed is sintered in the same furnace in a continuous operation. The sintering involves the application of heat and gas pressure.

The temperature reached in sintering may be about 1725° C., and the pressure reached may be between 5 and 11 bar (500 to 1100 kN/sq. meter), e.g. about 10 bar (1000 kN/sq. meter).

The invention also provides a sintered reaction-bonded silicon nitride component made by a method according to the invention. The component may be in the form of a valve train component for an internal combustion engine, e.g. a tappet shim, a roller follower, or a rocker insert.

There now follows a detailed description, to be read with reference to the accompanying drawings, of an illustrative method of manufacturing a sintered reaction-bonded silicon nitride component in accordance with the invention.

Figure 1:
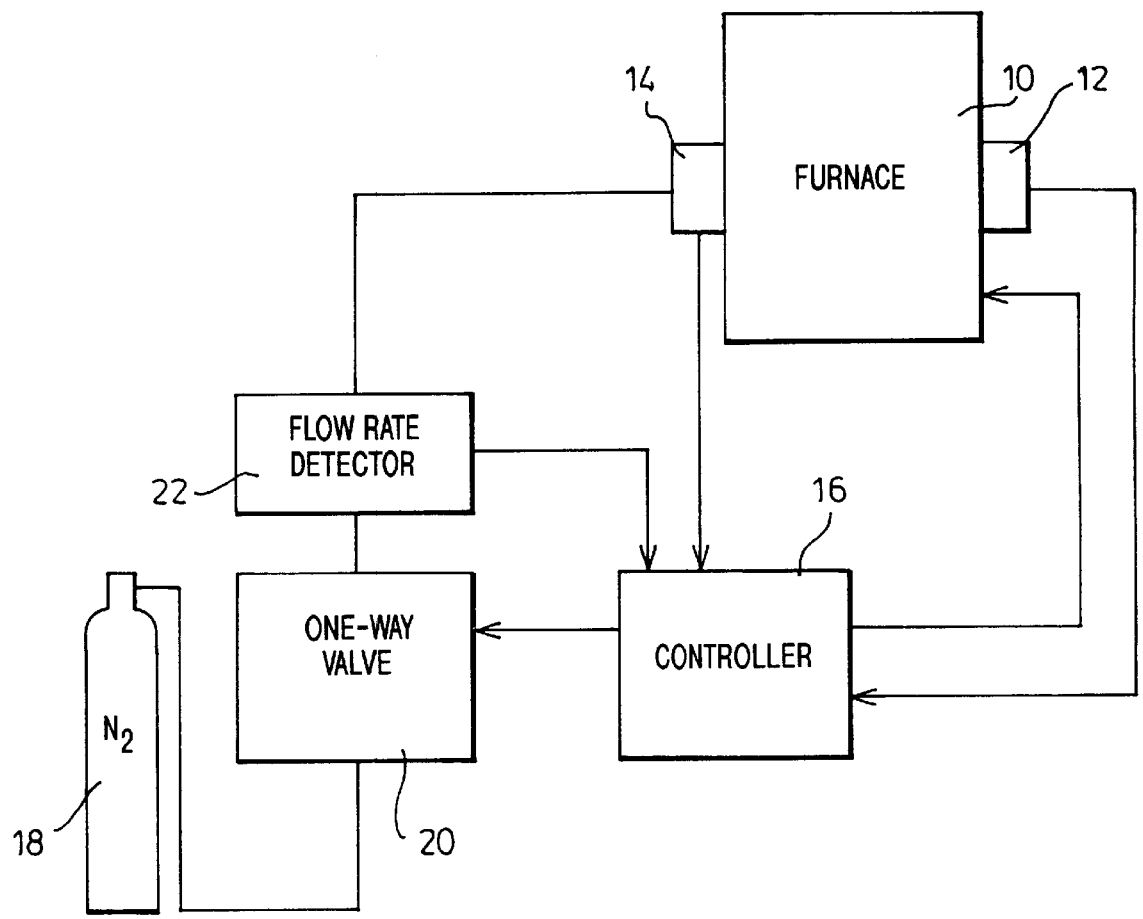
FIG. 1 is a diagrammatic view of an apparatus used in carrying out the illustrative method.

The illustrative method is a method of manufacturing a dense sintered reaction-bonded silicon nitride component. The component is a tappet shim, i.e. a disc-shaped insert set into the surface of the tappet which is engaged by the cam. The method comprises forming a powder mixture comprising substantially pure silicon and oxide or oxide precursor additives. Said additives comprise alumina and a calcium compound which, in this case, is calcium carbonate, calcium carbonate being a precursor of calcium oxide.

DETAILED DESCRIPTION OF THE INVENTION

The powder mixture is formed by mixing calcium carbonate powder, average particle size 7 $\mu$m, and $\alpha$ alumina powder average particle size 0.5 $\mu$m in a 1:1 mole ratio in aqueous suspension by ball milling. The dried additive mixture was then added to a well deflocculated 70% solids aqueous suspension of silicon powder of average particle size 5 $\mu$m containing 3% of a proprietary organic binder to generate a mixture which, after nitridation, would result in a silicon nitride composition containing 2.5% by weight CaO and 7.5% by weight alumina. The slurry so formed was spray dried resulting in free flowing spherical powder aggregates mainly in the size range 50–100 $\mu$m.

The illustrative method also comprises forming a preform from said powder mixture, the preform being generally in the shape of the component required. To form the preform, which was disc-shaped having a diameter of 30 mm and a thickness of 3 mm, the powder mixture was die-pressed to 60% of theoretical density by applying a pressure of 5 Tsi (77 MN/Sq. meter). The preform was debonded by heating to 350° C. in a recirculating air oven.

A furnace 10 was used in the illustrative method, the furnace 10 being a vacuum furnace capable of being operated at a maximum pressure of 10 bar and at temperatures up to a maximum of 1900° C. In order to meet the requirement for high temperature operation, the furnace was heated using graphite resistor elements and fitted with carbon insulation to protect the water cooled shell. The furnace was used to dry the preform and to react silicon in the preform with nitrogen to form silicon nitride. The furnace was also used to apply heat and gas over-pressure to sinter said silicon nitride.

In the illustrative method, the preform was dried by being placed in the furnace 10 which was heated to and held at a temperature of 800° C. for 1 hour under a continuously pumped vacuum of 0.01 Torr in order to remove water vapour and any other matter which is volatile under these conditions from the preform. During this drying phase, carbon dioxide was evolved from the carbonate.

Next, in the illustrative method, silicon in the preform was converted into silicon nitride by heating the preform in the furnace 10 under a nitrogen atmosphere. In this nitriding process, the temperature in the furnace 10 was controlled by monitoring the temperature using a detector 12 which supplied its output to a controller 16 which applied power to the furnace 10 as necessary. The pressure in the furnace 10 was also monitored by a detector 14 which also supplied its output to the controller 16. Also, during this nitriding process, nitrogen (99.9% pure) was allowed to flow into the furnace 10 on demand from a low pressure source 18 which was set at 2 psi (13.8 kN/m$^2$) above atmospheric pressure. Nitrogen entering the furnace 10 passed through a one-way flow control valve 20 and a flow rate detector 22 which monitored the flow rate of nitrogen into the furnace 10 and supplied its output to the controller 16. The controller 16 was able to operate the valve 20 to limit the maximum flow rate.

The nitriding process comprised four phases which are referred to as the pre-reaction heating phase, the first reaction phase, the second reaction phase, and the third reaction phase. These phases immediately followed one another and the pre-reaction heating phase immediately followed the above-described drying phases. The pressures, temperatures and flow rates of nitrogen during these phases are illustrated by FIG. 2.

Figure 2:
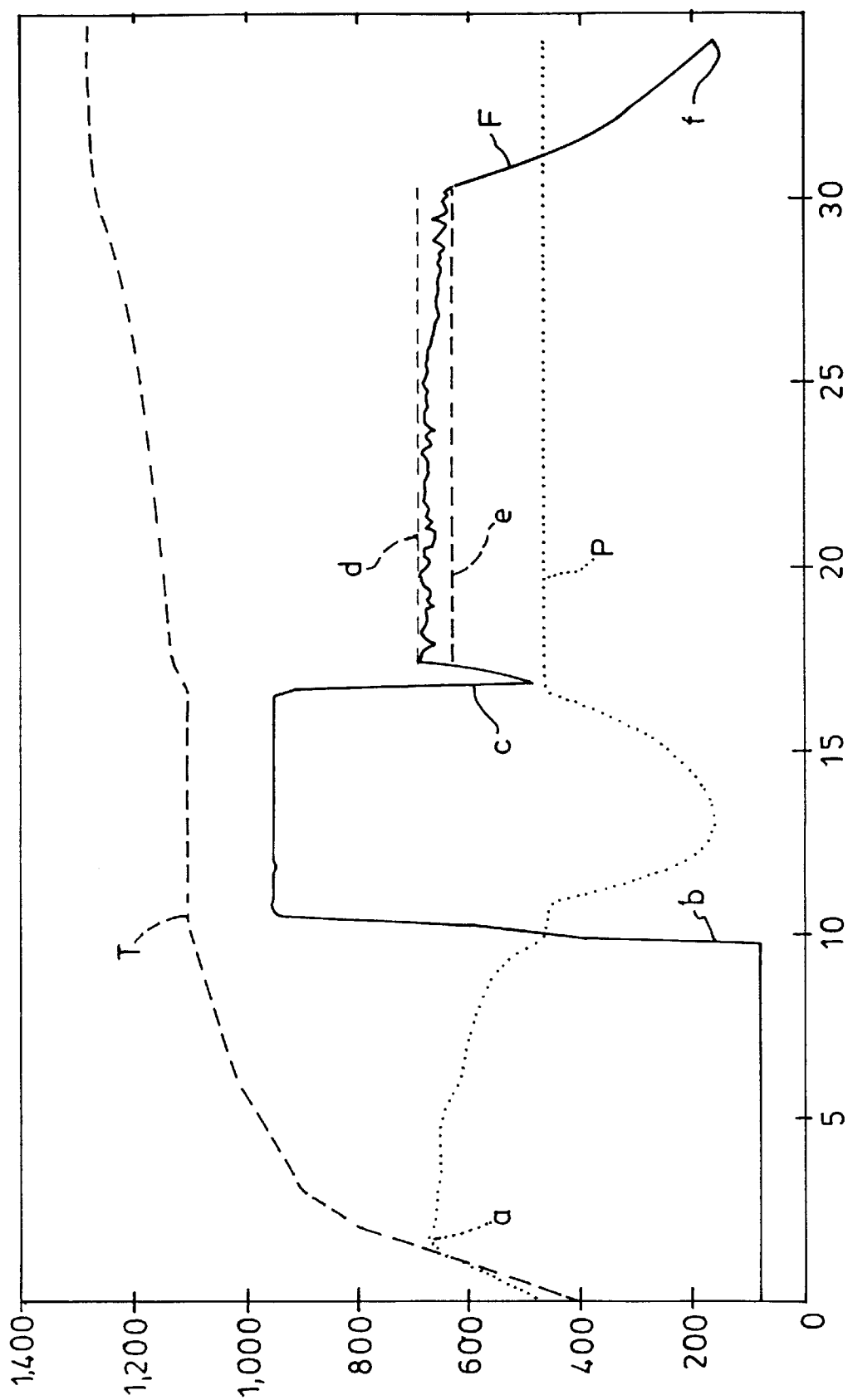
FIG. 2 is a graphical representation of pressure, temperature and nitrogen flow rate during a nitriding process of the illustrative method.

FIG. 2 shows time in hours along the x-axis and temperature in degrees centigrade along the y-axis. The y-axis scale only applies to the dashed line T which shows the temperature in the furnace 10. The solid line F represents the flow rate of nitrogen into the furnace 10 and the dotted line P represents the pressure in the furnace 10.

In the pre-reaction heating phase, the temperature was raised to cause the reaction to commence. Nitrogen was admitted into the furnace 10 so that the pressure in the furnace 10 commenced at the pressure of the source 18. During this phase, the pressure in the furnace rose above the pressure of the source so that there was no flow of nitrogen into the furnace. The pressure initially rose because of the rise in temperature until (at point "a" on line P) it caused operation of a pressure relief valve associated with source 18 (not shown). The temperature was raised, from a starting point of about 400° C. (to which the temperature had fallen after the previous drying phase during admission of nitrogen). The temperature was raised rapidly until 900° C. was achieved and thereafter at a slower rate. The pressure began to fall, due to the commencement of the reaction using up nitrogen until, at 2 psi (13.8 kN/m$^2$), nitrogen began to flow into the furnace. The flow rate then rose rapidly from zero and, when the flow rate reached a first predetermined level (indicated by point "b") which occurred after just under 10 hours, the pre-reaction phase was terminated and the first reaction phase was initiated.

During the first reaction phase, the temperature in the furnace 10 was held at a substantially constant level and the flow control valve 20 was used to control the flow of nitrogen so that it did not exceed a predetermined maximum rate. This predetermined maximum had been determined as a linear function of the weight of silicon in the preform. The pressure in the furnace 10 dropped below the 2 psi (13.8 kN/m$^2$) level as the reaction used more nitrogen than the flow into the furnace replaced. The heat created by the reaction assisted in maintaining the temperature of the furnace. When the flow rate fell below a second predetermined level (indicated by point "c") indicating that the reaction had slowed down, the first reaction phase was terminated and the second reaction phase was commenced.

In the second reaction phase, the flow rate of nitrogen was maintained between a predetermined upper limit (indicated by line "d") and a predetermined lower limit (indicated by the line "e"). This was achieved by controlling the temperature of the furnace. Specifically, the temperature was raised at a rate of 5° to 10° C. per hour when the flow rate reached said lower limit and was held substantially constant when the flow rate reached said upper limit. In this way, the reaction was encouraged when it began to slow down and this encouragement was withdrawn when it speeded up. The upper and lower limits were determined as linear functions of the total weight of silicon in the preform. The second reaction phase was terminated when a predetermined temperature was reached and the third reaction phase was commenced.

In the third reaction phase, the temperature was maintained substantially constant and the flow rate was allowed to drop. The third reaction phase was terminated when the flow rate reached a predetermined minimum (indicated by point "f"). This low flow rate indicating that a high proportion of the silicon had reacted with nitrogen to form silicon nitride.

Immediately upon termination of the third reaction phase, the sintering part of the illustrative method was commenced, i.e. without allowing the nitrided preform to cool. To commence sintering, the controller 16 isolated the nitrogen source 18 and applied a high pressure source of nitrogen (not shown) to the furnace 10. This raised the pressure in the furnace 10. Simultaneously, the controller 16 caused the temperature in the furnace to be raised at 600° C. per hour. When a pressure of 10 bar (1000 kN/m$^2$) and a temperature of 1725° C. was achieved, these conditions were maintained for 2 hours.

In the illustrative method, the pre-reaction phase lasted about 10 hours, the first reaction phase lasted about 6 hours, the second reaction phase lasted about 13 hours, and the third reaction phase lasted about 4 hours, the total time for the illustrative method being 46 hours.

The tappet shim made by the illustrative method was found to have a density of 3.10 gms/cc and an excellent surface finish. The shim exhibited low linear shrinkage (about 9%) from the preform. The Vickers Hardness of the component with a 500 g load was found to be 1400 kgm/mm$^2$. After diamond grinding to a surface finish of 0.05 micrometers Ra the shim was tested in the valve train of an internal combustion engine against a standard steel shim with the results shown in the table. The shim was lighter and quieter than the steel shim.

| Maximum Load/ Kg | Maximum Stress MPa | Tappet Type | Weight loss milligrams CAM/Tappet Shim | Time Hours |
|---|---|---|---|---|
| 183/1054 | | Steel | 115/25 | 100 |
| 159/1055 | | Si$_3$N$_4$ | 5/0 | 100 |

We claim:

1. A method of manufacturing a sintered reaction-bonded silicon nitride component having a density of at least 95% of theoretical density, the method comprising forming a powder mixture consisting essentially of substantially pure silicon and additives which are oxides or oxide precursors, the additives comprising alumina and a calcium compound, forming a preform from said powder mixture, the preform being generally in the shape of the component, reacting silicon in the preform with nitrogen to form silicon nitride, and sintering said silicon nitride, wherein the silicon is reacted with nitrogen in a nitriding process comprising heating the preform in a furnace under a nitrogen atmosphere while controlling the temperature in the furnace and allowing nitrogen to flow into the furnace on demand, the flow rate of nitrogen into the furnace being monitored, wherein the nitriding process comprises the following phases:
   a pre-reaction phase during which the temperature is raised to cause the reaction to commence;
   a first reaction phase during which the temperature in the furnace is held at a substantially constant level and the flow rate of nitrogen is controlled so that it does not exceed a predetermined maximum rate, the first reaction phase being initiated when said flow rate of nitrogen exceeds a first predetermined level, and being terminated when said flow rate falls below a second predetermined level; and
   a second reaction phase during which the flow rate of nitrogen is maintained between predetermined upper and lower limits by controlling the temperature in the furnace.

2. A method according to claim 1, wherein the additives form 5 to 15% by weight of the powder mixture.

3. A method according to claim 1, wherein the alumina forms 3 to 10% by weight of the powder mixture.

4. A method according to claim 1, wherein magnesia forms up to 3% by weight of said additives.

5. A method according to claim 1, wherein the calcium compound is calcium oxide which forms 1 to 3.5% by weight of the powder mixture.

6. A method according to claim 1, wherein the calcium compound is calcium carbonate.

7. A method according to claim 1, wherein during said pre-reaction phase, the temperature is raised at 80° to 120° C. per hour until a temperature of 950° to 1050° C. is achieved and at a slower rate thereafter.

8. A method according to claim 1, wherein said predetermined maximum flow rate of nitrogen is determined as a function of the total weight of silicon in the furnace.

9. A method according to claim 1, wherein said predetermined upper and lower limits on the flow rate of nitrogen are determined as a function of the total weight of silicon in the furnace.

10. A method according to claim 1, wherein said second reaction phase is terminated when the temperature in the furnace reaches a predetermined level.

11. A method according to claim 1, wherein after said second reaction phase, the method also comprises a phase during which the temperature in the furnace is maintained substantially constant and the flow rate of nitrogen is allowed to drop.

12. A method according to claim 1, wherein the silicon is reacted with nitrogen and the silicon nitride so formed is sintered in the same furnace in a continuous operation.

* * * * *

UNITED STATES PATENT AND TRADEMARK OFFICE
CERTIFICATE OF CORRECTION

PATENT NO. : 5,876,660
DATED : March 2, 1999
INVENTOR(S) : Wordsworth et al

It is certified that error appears in the above-identified patent and that said Letters Patent is hereby corrected as shown below:

Column 3, line 3, change "100°C." to --1000°C.--

Signed and Sealed this

Twenty-ninth Day of June, 1999

Attest:

Q. TODD DICKINSON

*Attesting Officer*     *Acting Commissioner of Patents and Trademarks*